United States Patent
Teoh et al.

(10) Patent No.: US 11,023,244 B2
(45) Date of Patent: Jun. 1, 2021

(54) SYSTEM, APPARATUS AND METHOD FOR RECOVERING LINK STATE DURING LINK TRAINING

(71) Applicant: Intel Corporation, Santa Clara, CA (US)

(72) Inventors: Ee Loon Teoh, Shrewsbury, MA (US); Eng Hun Ooi, Georgetown (MY); Roger K. Cheng, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 15/713,974

(22) Filed: Sep. 25, 2017

(65) Prior Publication Data
US 2019/0095215 A1 Mar. 28, 2019

(51) Int. Cl.
*G06F 9/38* (2018.01)
*G06F 13/20* (2006.01)
*G06F 13/42* (2006.01)
*G06F 1/32* (2019.01)
*G06F 11/07* (2006.01)
*G06F 13/40* (2006.01)
*G06F 11/30* (2006.01)

(52) U.S. Cl.
CPC .............. *G06F 9/3861* (2013.01); *G06F 1/32* (2013.01); *G06F 11/073* (2013.01); *G06F 11/0772* (2013.01); *G06F 11/0793* (2013.01); *G06F 11/3027* (2013.01); *G06F 13/20* (2013.01); *G06F 13/4004* (2013.01); *G06F 13/4282* (2013.01); *G06F 2211/002* (2013.01)

(58) Field of Classification Search
CPC ............ G06F 11/3027; G06F 11/0703; G06F 11/0772; G06F 11/0793; G06F 13/20; G06F 13/4004; G06F 13/4282; G06F 2211/002
See application file for complete search history.

(56) References Cited

U.S. PATENT DOCUMENTS

| | | | | |
|---|---|---|---|---|
| 7,853,731 B1 * | 12/2010 | Zeng | ...................... | G09G 5/006 710/18 |
| 9,712,424 B2 * | 7/2017 | Mangin | .................. | H04L 49/557 |
| 2005/0185705 A1 * | 8/2005 | Tanaka | .................... | H04B 3/238 375/222 |
| 2012/0014420 A1 * | 1/2012 | Wu | .................... | H04L 25/03343 375/219 |
| 2012/0317607 A1 * | 12/2012 | Wyatt | ...................... | G09G 5/006 725/127 |
| 2016/0092335 A1 * | 3/2016 | Boelter | .................. | G06F 11/349 714/47.1 |
| 2017/0093521 A1 * | 3/2017 | Wang | .................... | H04L 1/0002 |

OTHER PUBLICATIONS

Altera Corporation, "DDR4: Designing for Power and Performance," 2013, 48 pages.

* cited by examiner

*Primary Examiner* — Glenn A. Auve
(74) *Attorney, Agent, or Firm* — Trop, Pruner & Hu, P.C.

(57) ABSTRACT

In one embodiment, a link training controller is to train a link. The link training controller may be configured to: update a first link parameter of a link setting for the link to a first value; write data to the memory; read the data from the memory using the first value of the first link parameter; and in response to a determination that the data read from the memory does not match the data written to the memory, send an in-band link recovery command to the memory via the link to cause the memory to participate in a link recovery protocol with the apparatus. Other embodiments are described and claimed.

19 Claims, 8 Drawing Sheets

SYSTEM, APPARATUS AND METHOD FOR RECOVERING LINK STATE DURING LINK TRAINING

TECHNICAL FIELD

Embodiments relate to interconnects and more specifically to training of interconnects in a computer system.

BACKGROUND

In computer systems, certain interconnects such as high-speed memory links undergo link training of analog circuit parameters in order to achieve the largest data valid period. These circuit parameters may include timing delays to improve setup and hold times and voltage reference set points for improved signal voltage margins at a receiver. The typical mechanism for link training is to sweep the circuit parameter settings in order to find passing and failing points. However, when a parameter is swept beyond a passing region, the link becomes unusable and the parameter is modified back to the passing region in order to regain link functionality. In the case of in-band commands being used to train the link, there is no mechanism to recover from this failure except to reset the system, which consumes an undesired large amount of time and compute resources to bring the system back to the last point of training prior to the failure and resume the training from that point.

DETAILED DESCRIPTION

In various embodiments, link training of an interconnect can be performed with techniques for efficient link recovery in the case of link failure during the training. More specifically, embodiments provide for recovery of the failing link/link partner in response to an in-band link training recovery command. In this way, link recovery can proceed without additional out-of-band signaling. Still further, embodiments may cause the link recovery process to proceed via a recovery to a specified known good setting of one or more parameters of a link setting. And embodiments may perform this recovery without use of an out-of-band reset, reducing latency and complexity. In embodiments, when a link is trained to a point where a latest setting breaks a link/link partner, an in-band link recovery command is used to instruct the link partner to revert to a specified, known good setting to allow link training to resume. In this way, a reset of the link/link partner using an out-of-band reset mechanism is avoided. Thus using an embodiment, the latency incurred in a reset, which includes a wait for the system to settle after reset, set the link/link partner back to a known good state and resume training, may be avoided.

Figure 1:
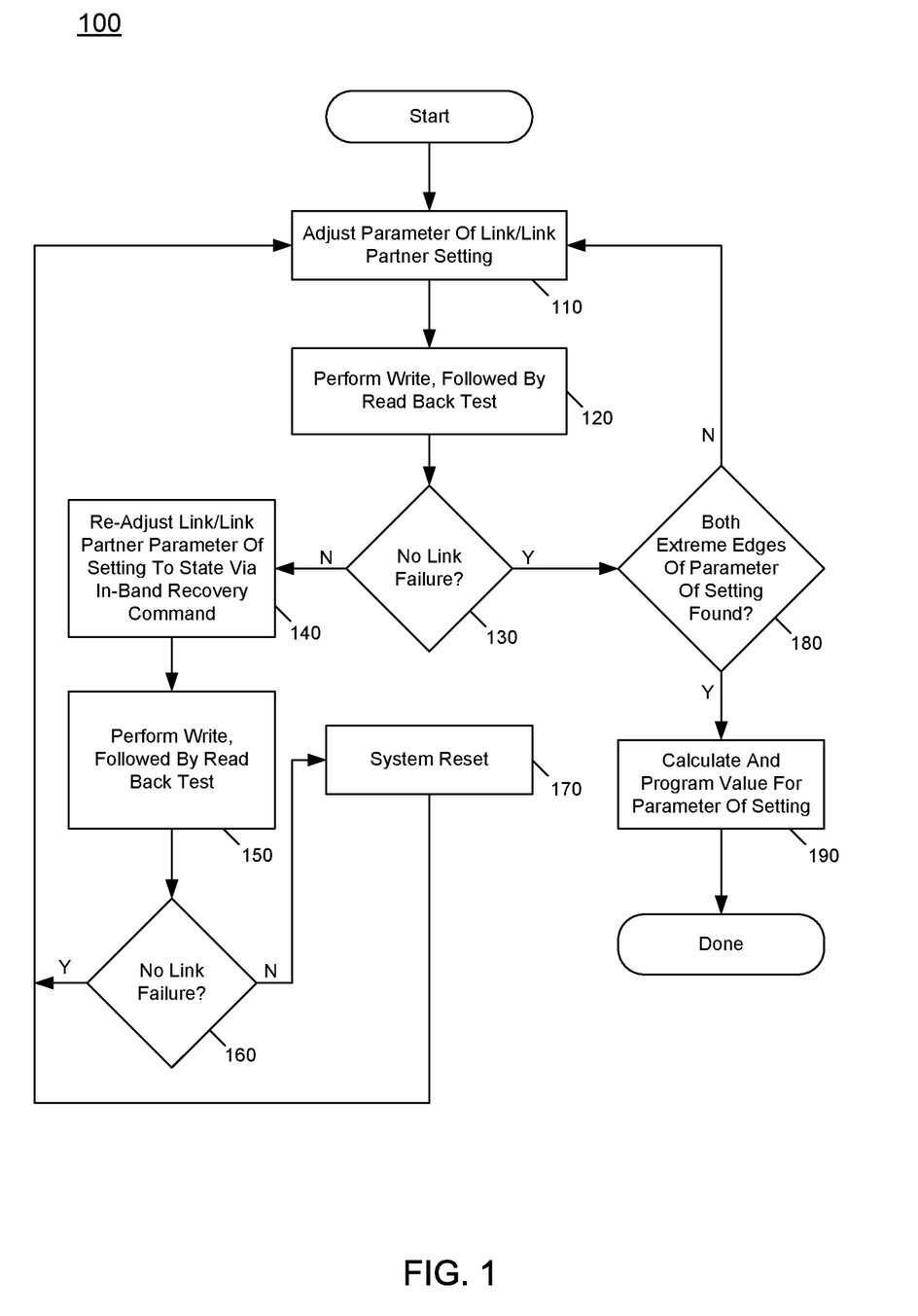
FIG. 1 is a flow diagram of a method in accordance with an embodiment of the present invention.

Referring now to FIG. 1, shown is a flow diagram of a method in accordance with an embodiment of the present invention. More specifically, method 100 shown in FIG. 1 is a method for performing link training of a physical link that interconnects multiple devices. While the embodiments described herein are in the context of a memory interconnect that couples a given device to a memory, understand the scope of the present invention is not limited in this regard. That is, embodiments are applicable to a wide range of buses or other interconnects that couple electronic components. For example, embodiments may be used for interconnects such as point-to-point high-speed single-ended interconnects to couple between a system-on-chip (SoC) and application specific integrated circuit (ASIC) or between a memory controller and volatile memory and/or non-volatile random access memory (NV-RAM) subsystem. In the embodiment of FIG. 1, method 100 may be performed by a link controller, such as a link training circuit of a processor or other SoC that couples to a given memory and is the initiator and master of a link training process. As such, method 100 may be performed by hardware circuitry, software, firmware and/or combinations thereof.

As illustrated, link training begins at block 110 by adjusting a given parameter of a link setting of a link. More specifically, this link setting is used by devices coupled together via the link. In embodiments, a link setting for a link that couples components may be formed of multiple individual link parameters for the link. As examples, these link parameters correspond to various operating parameters for the link and may include a reference voltage, operating frequency, link width, signal swing, among many others.

For purposes of illustration in the FIG. 1 embodiment, the link training in method 100 is for a single link parameter. For example, assume the setting is a threshold voltage (for determination of whether an incoming signal is a logic 1 or a logic 0). This setting may be set, e.g., in a configuration register of the initiating device (in this case the link training circuit or other link controller), in addition to communicating this link setting to the remote link partner to enable the partner to also update a given configuration register. Although the scope of the present invention is not limited in this regard, in embodiments this link training process for the given link parameter may proceed from an initial configured value. In embodiments, this initial configured value may be obtained from an appropriate storage, such as part of boot firmware or so forth. In some cases this initial link setting may be a predetermined midpoint value, while in other cases, the initial link parameter may be set at a predetermined minimum or maximum value. Depending on implementation, method 100 may proceed iteratively in one direction until one extreme edge of a valid link setting is found and then may proceed in the other direction to find the other extreme edge.

As shown in FIG. 1, control next passes to block 120 where a write operation is performed, followed by a read back test. Note that this write may be a write command having a predetermined data pattern, which is thus sent from the initiator to the link partner. Thereafter data at the address within the memory to which this predetermined data is directed is also read back to determine whether the read data matches the write data. In an embodiment, this predetermined test pattern includes a substantial amount of toggling to rigorously test accuracy of communications on the link. In various embodiments, this predetermined test pattern also may be obtained from, e.g., boot firmware. At diamond 130 it is determined whether there is no link failure. No link failure occurs when the read data is read back correctly (or at least to within a predetermined threshold) and appropriate responses are received from the link partner, such as acknowledgement of the write command and a read response that provides the data. Instead, in embodiments link failure may be determined if the link partner fails to respond or there are read data mismatches.

If a link failure is identified at diamond 130, control passes to block 140. At block 140 a link readjustment process occurs. More specifically, the initiator may cause the link/link partner setting to be updated. Namely this setting is updated to a specified, known good state. For example, this known good state may correspond to a last setting at which the write and read back test at block 120 resulted in no link error (as determined at diamond 130). Thus in embodiments, when update to a link setting occurs (as at block 110), a prior link setting that resulted in correct link behavior may be stored in a prior link setting storage, which may be a field within one or more configuration registers, so that this value may be used to provide the adjusted setting at block 140. Note further that this readjustment to the link setting may be issued via an in-band recovery command. While details of this in-band recovery command are described further below, understand that the command may be communicated in a manner to ensure correct receipt within the link partner. That is, this link recovery command may be sent over a number of communication cycles and at a level that is likely to be successfully received and processed in the link partner. As such, the overhead and latency incurred either for out-of-band communication or a complete reset of the link and/or system re-initialization are avoided.

Still referring to FIG. 1, control next passes to block 150 where a write operation is performed, followed by a read back test. Note that this write may be a write command having a different data pattern than above. More specifically, a more basic data pattern can be sent (e.g., less rigorous toggling, etc.) to be used to determine whether the link recovery was successful. Thereafter, at diamond 160 it is determined whether there has been no link failure during this test. As above, this determination may be based on whether the received read data matches the written data. If there is no link failure, control passes back to block 110 for another adjustment to the link setting.

Instead if it is determined that the re-adjusted link setting at block 140 leads to another link failure (as determined at diamond 160), control passes to block 170 where a system reset may occur. Although the scope of the present invention is not limited in this regard, in an embodiment this system reset may include shutting down the memory system and re-powering the memory system. Reset may potentially include reprogramming various settings back to a known good state. For example, prior to system reset, a last known good setting may be stored in a non-volatile storage. Upon system reset, the last known good values may be re-applied and tuning may begin again from that point. After system reset, control passes back to block 110, discussed above.

Still referring to FIG. 1, if instead it is determined at diamond 130 that there was no link failure after the write back test with an adjusted link setting, control passes to diamond 180. At diamond 180 it is determined whether both extreme edges of the setting have been found. Note that these extreme edges may be the link setting in both directions at which a failure of the link is identified. If both edges have not been found, control passes back to block 110. Now in traversing the loop of method 100, updated link settings in the same direction may occur until a first extreme edge setting has been found. Then when this first extreme edge setting has been found, updates to the link setting may occur in the other direction (e.g., from an initial setting) to enable identification of the second extreme edge of the link setting.

Still with reference to FIG. 1, if instead at diamond 180 it is determined that both extreme edges of the setting have been found, control passes to block 190 where a center setting for the given link setting can be calculated. In one embodiment, this calculated link setting may be at a center value between the two extreme edges, such that the widest margin for the given link setting is available. Understand while shown at this high level in the embodiment of FIG. 1, many variations and alternatives are possible.

Figure 2:
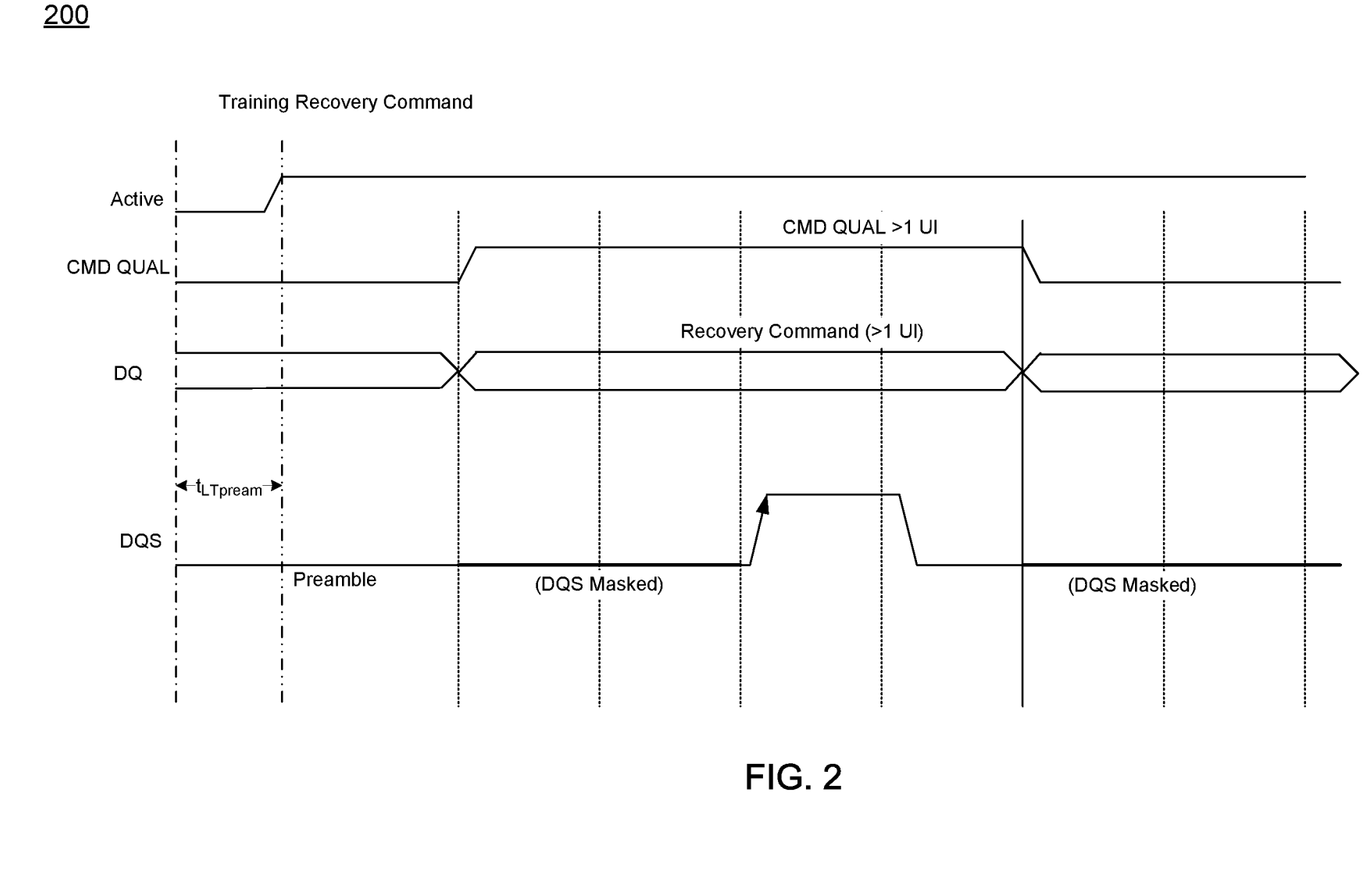
FIG. 2 is a timing illustration of communication of signals for a training recovery process in accordance with an embodiment.

Referring now to FIG. 2, shown is a timing illustration of communication of signals for a training recovery process in accordance with an embodiment. As shown in FIG. 2, training recovery may occur when an active signal is high. Furthermore a command qualifier (CMD QUAL) may be active for multiple unit intervals (UIs). This command qualifer is thus an indication that information sent on data lines of the interconnect (namely DQ lines) is a command type of communication. Instead when this signal is inactive (e.g., logic low), this indicates communication of data.

As further illustrated, the training recovery command, which is more than one UI wide, is communicated on the data (DQ) lines. In an embodiment, this recovery command is thus sent in-band and includes a link training recovery (LTR) command and a predetermined recovery code. In an embodiment the LTR command may include a programmable value (namely a known good value for the given link setting). In an embodiment, this LTR command may issue with a format with a recovery command code followed by a value for at least the link setting parameter. In an embodiment, the recovery command code may be 6 bits, and the link setting may be between approximately 6 and 8 bits, in a 16-bit DQ bus. Note that the recovery command (including a command value and known good link setting value) may be one UI or less in width and the same command is sent multiple times in seriatim, to better guarantee correct receipt within the link partner.

As illustrated in FIG. 2, this in-band link recovery command is constructed so that it inherently has large link margins with multiple UI's. Since link training margins the link just to the point of failure with stressful data patterns, this robust recovery mechanism is likely to have a large margin to failure.

Further, as illustrated the enable signal, namely a strobe signal (DQS) is activated within a substantial mid-portion of the set of UIs having the command, to ensure a largest margin for correct receipt and handling.

Note that in different embodiments, the known good value for the given link setting may be based on an initial configuration value, or it may be based on a prior link setting used during the training at which read back information was correctly received. In other embodiments, instead of sending a particular known good value from the initiator of link training to the link partner, link recovery command may simply instruct the link partner to revert to a value for the link parameter that the link partner believed was a good state, such as the immediate prior value. In other cases, a policy register setting may be used in the transmitting and receiving link partner. Based on common policy settings on both sides, the link partner receiving the recovery command may restore either the immediate previous value just before the current one or a default configuration setting.

Still with reference to FIG. 2, note that this recovery command code may be latched according to a strobe signal (DQS), namely when this signal is unmasked, after a preamble portion and a masked strobe portion. Using an embodiment, a link recovery command may validly be communicated on a failed or unreliable link by leveraging properties of the command. That is, this recovery command is a fixed recovery command code that is static over multiple UI's and is activated (strobed) in the middle of this UI stream with a single strobe signal. Note that the safe value (when communicated) is also static over multi-UI large timing margin on the link and equally strobed. With this format of link recovery command, a robust in-band recovery mechanism is provided to instruct the link/link partner to revert to a specified known good setting (which may be determined by the link partner itself, in some cases). This recovery command along with an updated one or more parameters for the link setting can be transmitted reliably over a failed link. Understand while shown at this high level in the embodiment of FIG. 2, many variations and alternatives are possible.

Figure 3:
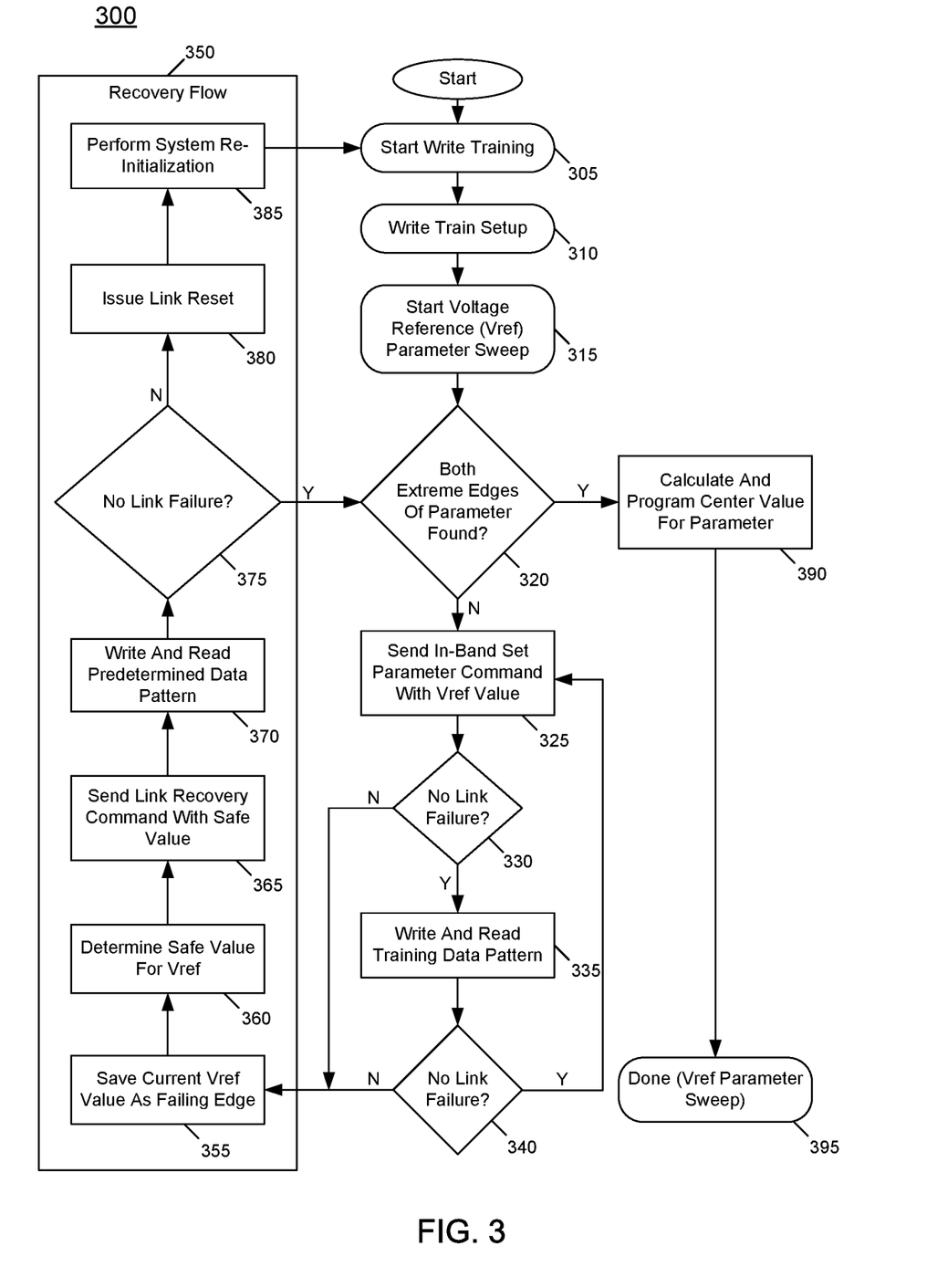
FIG. 3 is a flow diagram of a method in accordance with another embodiment of the present invention.

Referring now to FIG. 3, shown is a method in accordance with another embodiment of the present invention. More specifically, method 300 shown in FIG. 3 is a detailed method for performing in-band link recovery in accordance with an embodiment. Method 300 is described in the context of a link setting corresponding to a reference voltage (Vref) parameter. Understand that method 300 may similarly be performed for a plurality of different parameters of a link setting set.

As with FIG. 1, method 300 may be performed by a link controller [update], and may begin upon initialization and entry into a training process. At block 305, write training may begin. In general, write training involves adjusting the data (DQ) and/or the data strobe (DQS) until the receiver receives the command/data correctly. Next at block 310 a write train setup process occurs to set the DQ and DQS settings to the best setting as determined by the write training. Thereafter, control passes to block 315 where a reference voltage parameter sweep may begin. That is, this reference voltage parameter, which may be a reference voltage at which incoming information is to be identified as a logic high or low, may sweep between a range of values, e.g., staring with a midpoint between a specified minimum and maximum value. Alternately, the sweep may begin from the maximum value and proceed towards a minimum value or vice-versa.

Control next passes to diamond 320 where it is determined whether both extreme edges of the parameter have been found. If not, control passes to block 325 where an in-band set parameter command is sent for this given Vref value. Next at diamond 330 it is determined whether there has been no link failure. In an embodiment, this determination may be based on whether the remote link partner acknowledges receipt of this command. If no link failure is identified, control passes to block 335 where a training data pattern may be written to the remote link partner and read therefrom. Next it is determined at diamond 340 whether there has been no link failure. In an embodiment, this determination may be based on whether the link partner fails to respond or there are read data mismatches. If a failure is not identified, control passes back to block 325 where another in-band set parameter command may be sent, with an updated value for the given link setting parameter (here Vref).

Still with reference to FIG. 3, instead if it is determined at diamond 340 that a link failure has been identified, control passes to flow 350 which is a recovery flow in accordance with an embodiment. As illustrated in FIG. 3, recovery flow 350 begins by saving a current value of the link setting parameter (here a current Vref value) as a failing edge value (block 355). For example, the link controller may include a configuration or other storage to store multiple failing edge values for a given parameter of a link setting. Next, control passes to block 360 where a safe value may be determined. In an embodiment, this determination of safe value may be with reference to a prior value of the given link setting parameter that did not result in link failure or a configured safe value.

Next control passes to block 365 where a link recovery command is sent. More specifically, in this instance this command is a link recovery command that is sent with the safe value of Vref. In other cases the link training recovery command may be sent with an indication to the remote link parameter to revert the link setting to what it believes to be a good value. After communication of this command, control passes to block 370 where a simple data pattern may be written and read. Note that this simple data pattern may be a more basic and less rigorous test pattern than the normal data pattern sent for link training. This is the case, as in this recovery flow, it suffices to establish that valid communication is occurring. Next it is determined at diamond 375 that there is no link failure. In an embodiment, this determination may be based at least in part on whether the link partner fails to respond or there are read data mismatches in this simple data pattern. If no link failure is identified, recovery flow 350 thus concludes, and control passes back to diamond 320, discussed above to determine whether both extreme edges of the setting have been found.

Otherwise, if a link failure is identified (at diamond 375), control passes to block 380 where a link reset may be issued. In an embodiment, this link reset may be issued by asserting a RESET_N to the link partner. Note that this link reset is issued on an out-of-band link, namely a separate reset pin different than the data lines on which the above-described link recovery command is sent. As such, greater overhead and latency is incurred in this reset of the link. As an example, link reset may include asserting the reset for a predetermined time, bringing the link partner out of reset and waiting for the link partner to become active from reset (including potentially bringing up its own clock source), which may incur significant delay. Thereafter, control passes to block 385 where a system re-initialization occurs. System re-initialization may include setting the various parameters/ settings on both sides of the link back to a good state, and potentially trying to send/receive a few cycles to ensure correctness of the settings. Thus at this point after an attempt to recover from the link error with a known prior good state, should the recovery fail, a reset and system re-initialization proceeds. In many instances, with a link recovery command with a safe value, no link failure occurs and thus training may continue without the overhead and inefficiency of this reset and re-initialization.

Still with reference to FIG. 3, if it is determined at diamond 320 that both extreme edges of the parameter have been found, control passes to block 390 where a center setting for the given parameter of the link setting can be calculated. In one embodiment, this calculated link setting may be at a center value between the two extreme edges. At this point, link training is completed for the given parameter (here Vref) at block 395. Note that if there are additional parameters of the link setting to be trained, method 300 may proceed iteratively to identify such trained parameters. Understand while shown at this high level in the embodiment of FIG. 3, many variations and alternatives are possible.

Figure 4:
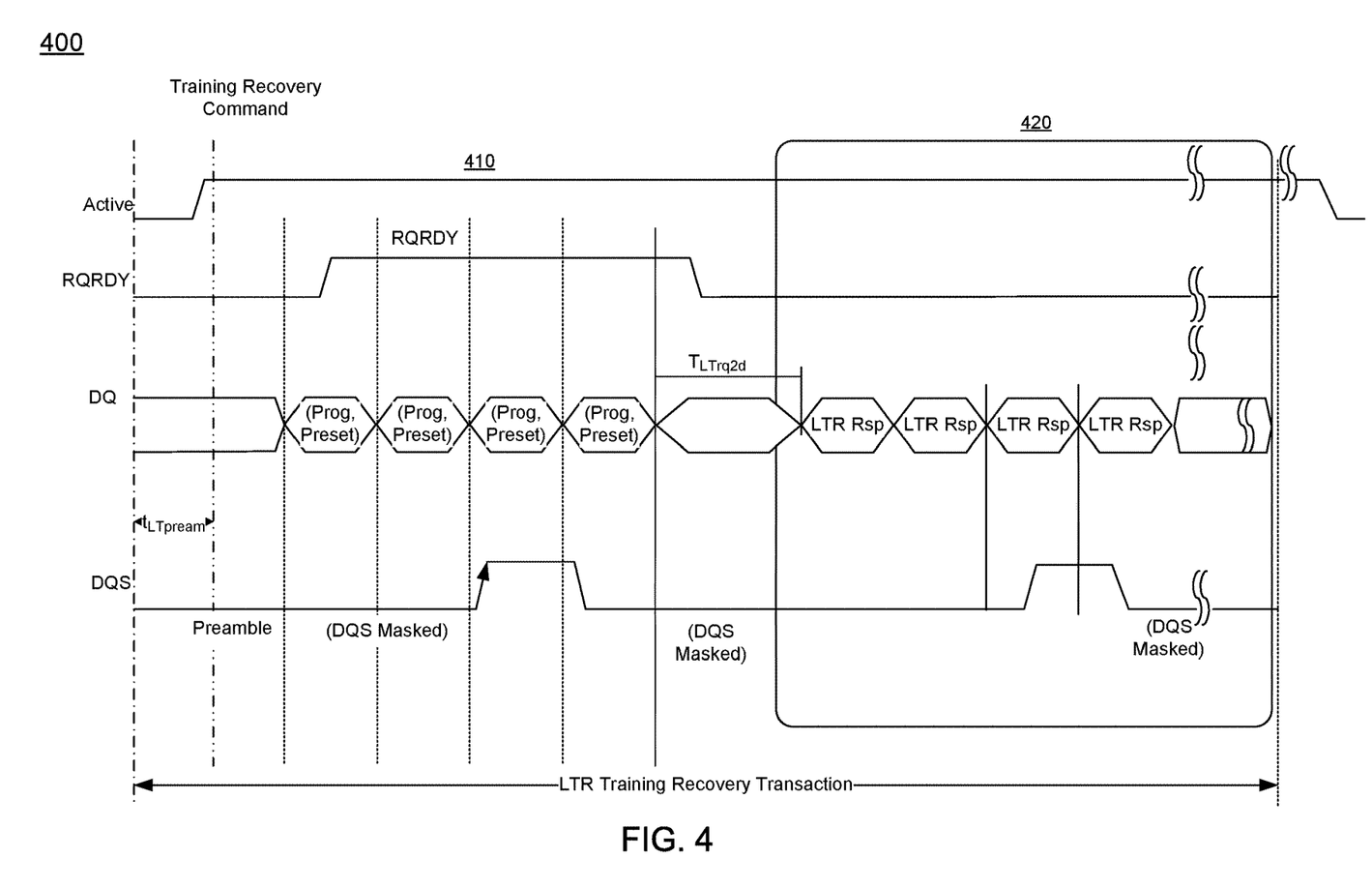
FIG. 4 is a timing illustration of a link training recovery communication protocol in accordance with another embodiment of the present invention.

Referring now to FIG. 4, shown is a graphical illustration of a link training recovery communication protocol in accordance with another embodiment. As illustrated in FIG. 4, a recovery command is sent with multi-UI margin. More specifically, a first portion of a link training recovery transaction 410 is illustrated, separated from a second portion 420 of the link training recovery transaction by a time interval of $T_{LTRQ2D}$. By way of these two portions of the link training recovery transaction, a basic communication occurs via the in-band link. Namely the data lines communicate a single link training recovery command multiple times over a number of UIs from initiator to the link partner. In turn, a strobe signal is sent in a substantial midpoint of these multiple UIs to indicate valid data sent. After a given duration of time following these multiple link recovery commands, the link partner sends an acknowledgement in a similar format. Namely, a link training recovery response is sent that is formed of multiple UIs, each including the same message content (e.g., a predetermined acknowledgement). Upon successful receipt and recovery of this link training recovery response from the link partner, the link initiator (namely the link controller) can identify link training recovery success. As such, further training of the link proceeds without the increased latency, power consumption and other overhead of performing reset and/or system re-initialization.

Using an embodiment, total training time and compute resources for such training may be reduced. More specifically, embodiments may realize link recovery in response to a link training recovery command that is sent in-band to a link partner without any out-of-band signaling, thereby eliminating the need for additional signaling. In addition, recovery may proceed without reset, thereby eliminating the reset time and compute resources to perform system reset and updating all settings back to a known good state to continue training.

Figure 5:
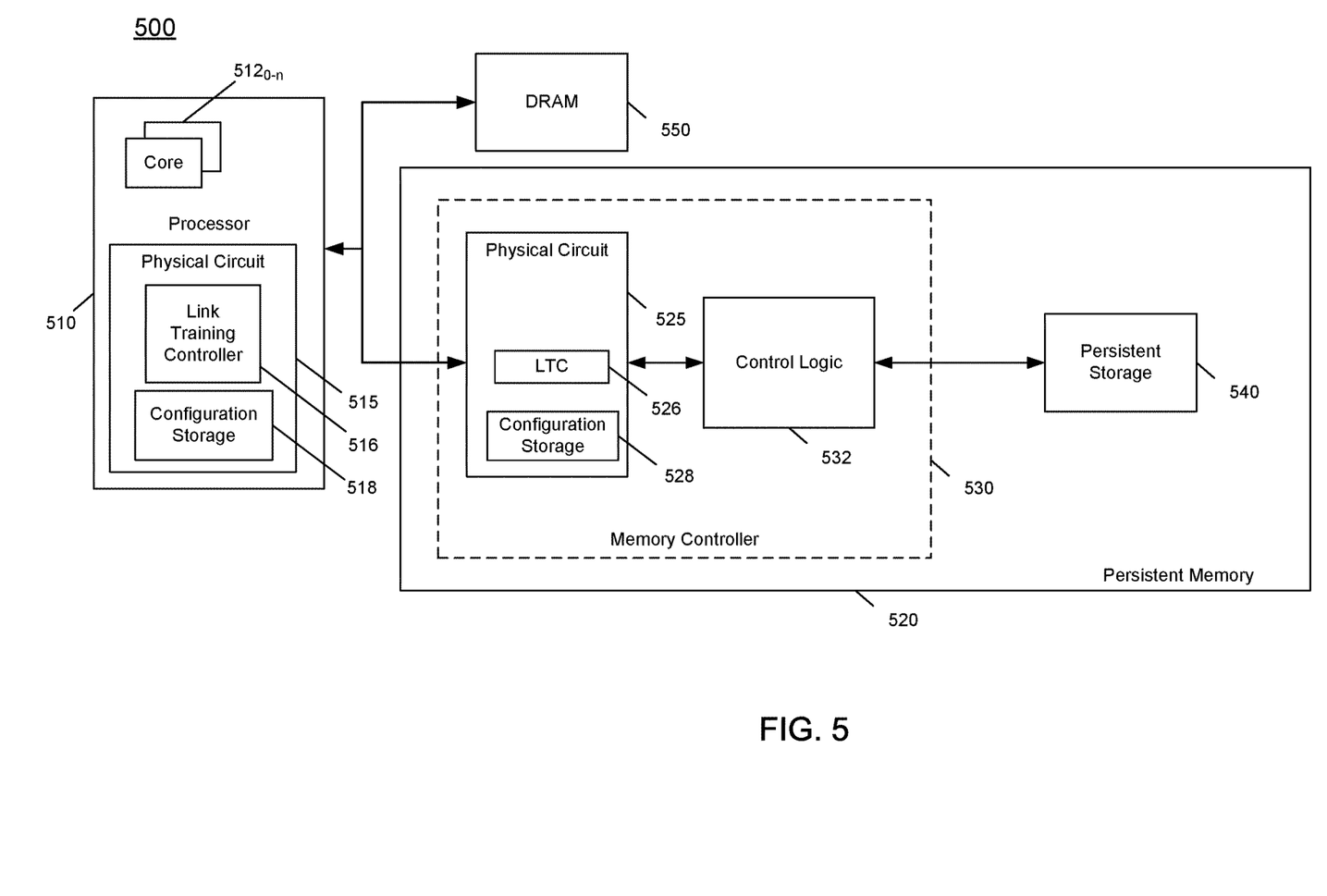
FIG. 5 is a block diagram of a system in accordance with an embodiment.

Referring now to FIG. 5, shown is a block diagram of a system in accordance with an embodiment. As shown in the embodiment of FIG. 5, system 500 includes a processor 510, which may be a multicore processor or other SoC including a plurality of cores $512_0$-$512_n$. In addition, system 500 includes a system memory 550, implemented as DRAM. Instead of a conventional system memory arrangement, DRAM 550 may operate and be exposed as a cache for a persistent memory 520. In an embodiment, DRAM 550 may be orders of magnitude larger in capacity than a processor cache, and may be exposed as a cache memory for persistent memory 520.

As illustrated in FIG. 5, processor 510 further includes a physical circuit 515. In general, physical circuit 515 may control communications across various links that couple to processor 510. In the embodiment shown, physical circuit 515 includes a link training controller 516 and a configuration storage 518. Link training controller 516 may perform link training for various interconnects, including memory interconnects that couple processor 510 to system memory 550 and persistent memory 520. Still further, link training controller 516 may be configured to perform link recovery in accordance with the embodiments described herein. As such, understand that method 100 and method 300 may be performed at least in part within physical circuit 515 including link training controller 516.

In embodiments, configuration storage 518 may store various configuration information to enable data communication. Relevant to embodiments herein, configuration storage 518 may include configured values for various parameters of link settings. These configured values may include predetermined initial settings, such as may be received upon boot. In addition, trained values, which correspond to updated parameters determined during link training to enable optimized data communications, also may be stored in configuration storage 518. In addition, to perform the link recovery performed herein, configuration storage 518 further may store various predetermined data patterns, including so-called rigorous data patterns that have significant amount of toggling and more basic or simple data patterns that may be used for purposes of link recovery as described herein.

In the embodiment of FIG. 5, persistent memory 520 may be implemented as a persistent memory DIMM or another non-volatile memory array. Of course other implementations of a persistent memory may be present in other embodiments. Processor 510, in an embodiment may couple to DRAM 550 via a double data rate (DDR) interconnect. In turn, processor 510 may couple to persistent memory 520 by a DDR-T interconnect.

As illustrated, persistent memory 520 includes a persistent storage 540. In various embodiments, persistent storage 540 may be implemented by one or more of different types of persistent storage devices such as phase change, memristor, or other advanced memory technology. As an example, persistent storage 540 may be implemented as a set of DIMMs or other memory chips coupled to a memory circuit board such as a DIMM memory module.

As further illustrated, persistent memory 520 includes a memory controller 530. In an embodiment, memory controller 530 may be implemented as another chip on the memory circuit board and may include one or more microcontrollers or other processing units, control logics and so forth. As further illustrated, memory controller 530 includes a control logic 532 that may control read and write operations with respect to persistent storage 540. In addition, memory controller 520 further includes a physical circuit 525. In some cases, physical circuit 525 may similarly include a link training controller 526 and a configuration storage 528. Such components may be similarly adapted to those discussed within physical circuit 515. As such, in some embodiments it is possible for link training controller 526 of physical circuit 525 to control link recovery as described herein as an initiator.

Figure 6:
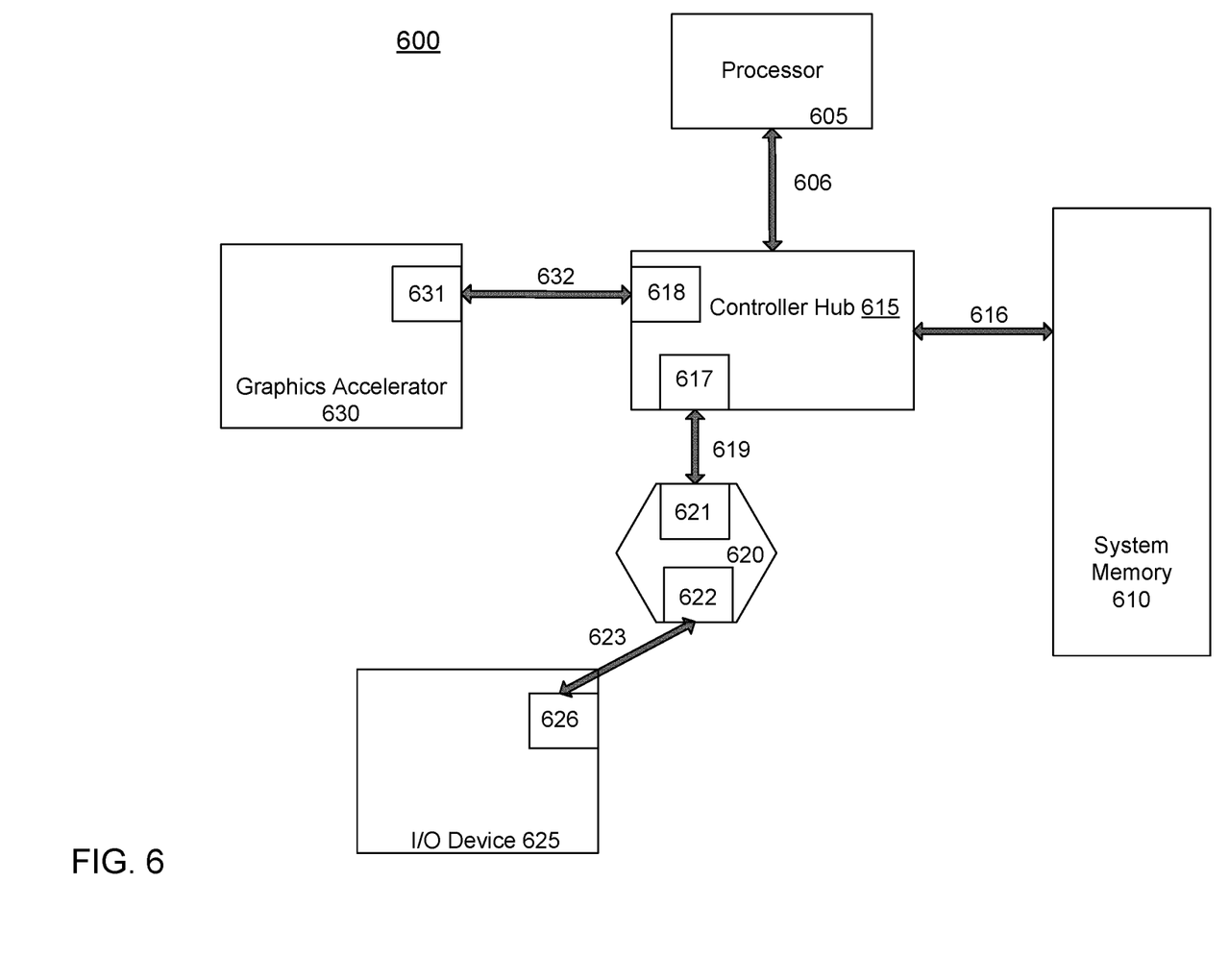
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect.

System memory 610 includes any memory device, such as random access memory (RAM), non-volatile (NV) memory, or other memory accessible by devices in system 600. System memory 610 is coupled to controller hub 615 through a memory link 616. Examples of a memory interface include a double-data rate (DDR) memory interface, a dual-channel DDR memory interface, and a dynamic RAM (DRAM) memory interface. Processor 605 and/or controller hub 615 may initiate link recovery on memory link 616 during training as described herein.

In one embodiment, controller hub 615 is a root hub, root complex, or root controller in a PCIe interconnection hierarchy. Examples of controller hub 615 include a chipset, a memory controller hub (MCH), a northbridge, an interconnect controller hub (ICH), a southbridge, and a root controller/hub. Often the term chipset refers to two physically separate controller hubs, i.e., a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through controller hub 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a network interface controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
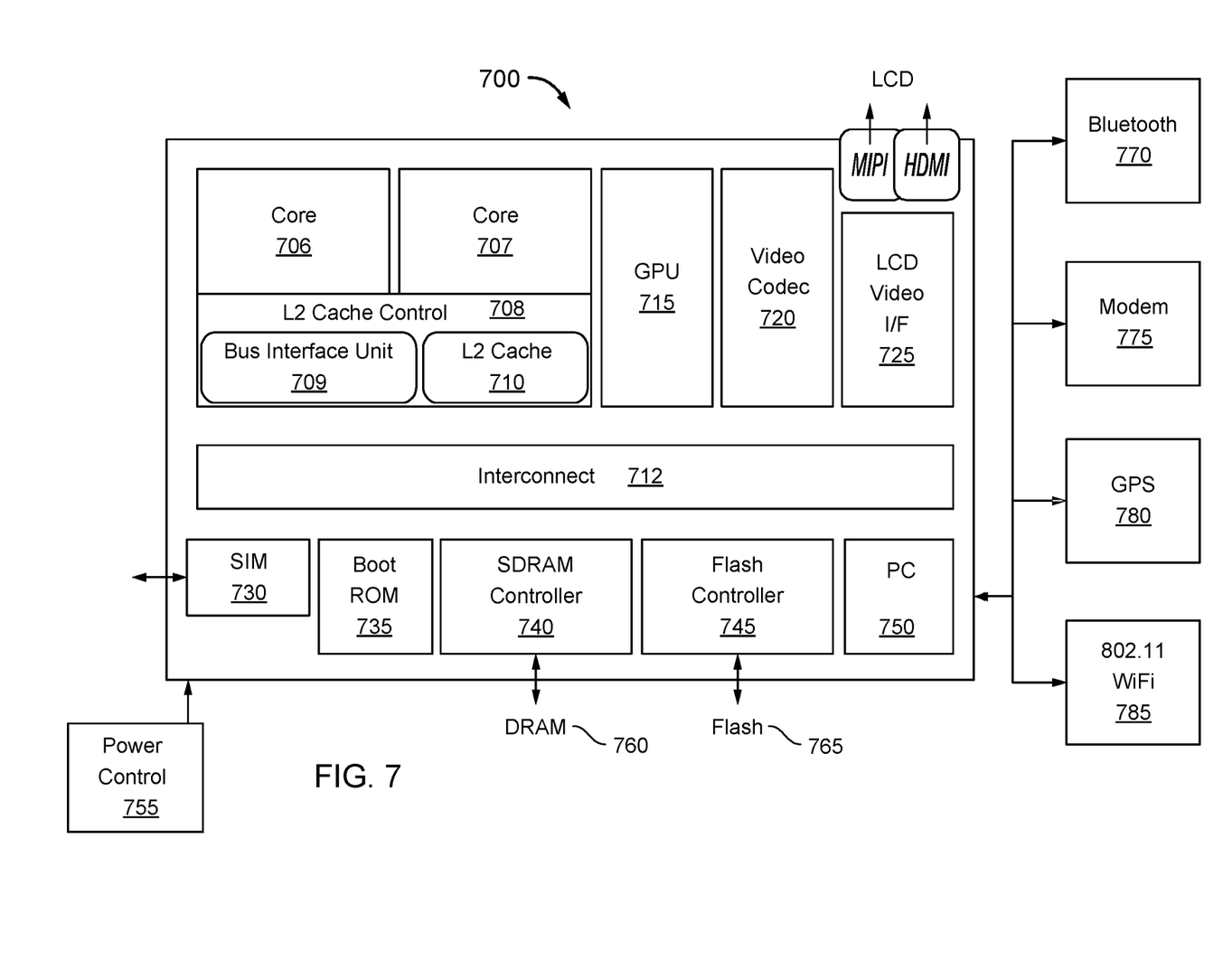
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an instruction set architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. In addition, the system illustrates peripherals for communication, such as a Bluetooth module 770, modem 775, GPS 780, and WiFi 785. Any of the interconnects/interfaces that couple these components may incorporate aspects described herein, including the link training recovery techniques described herein. Also included in the system is a power controller 755.

Figure 8:
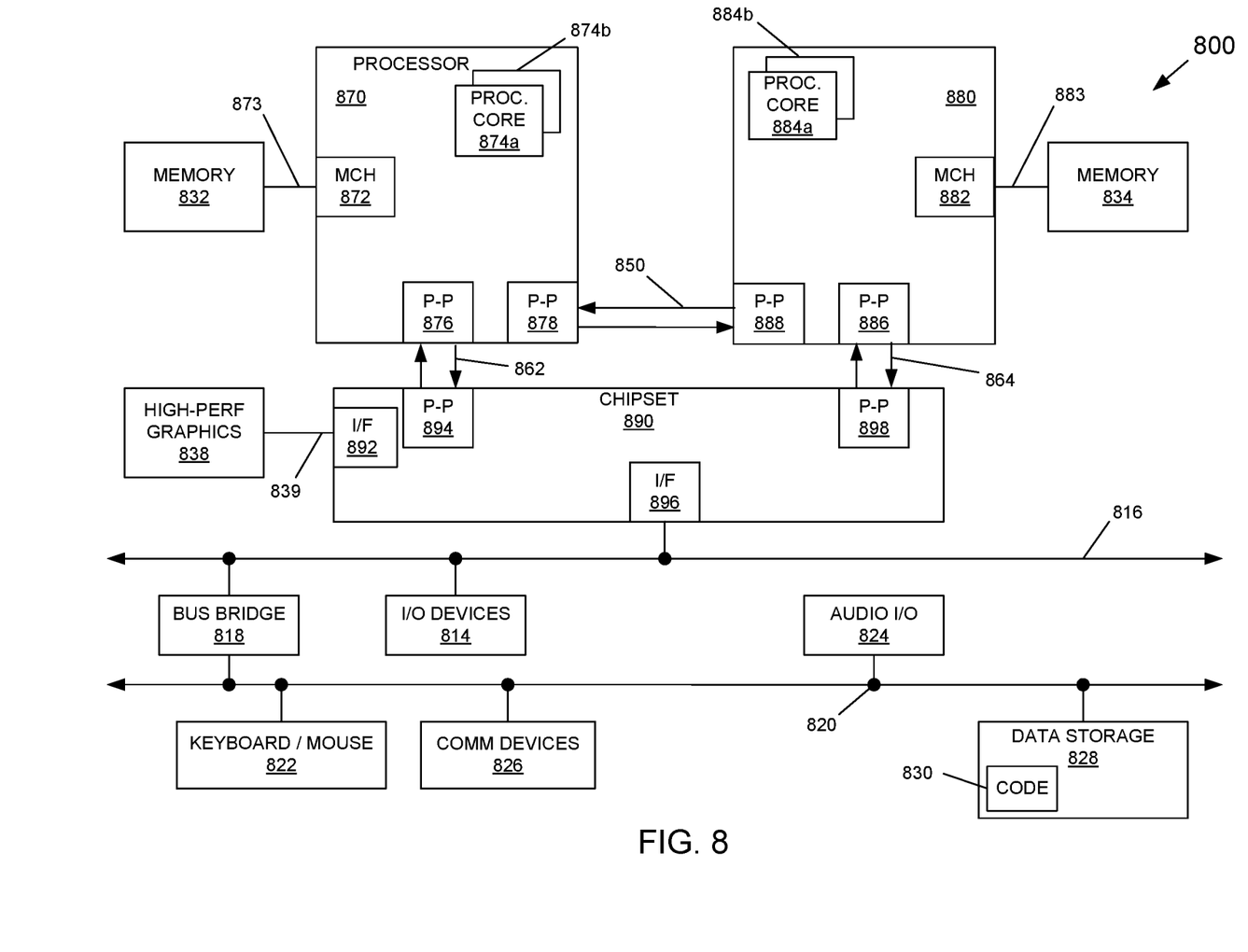
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850, As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors via memory links 873, 883. Should link failure occur during training, MCHs 872, 882 (and/or the memories themselves) may initiate link training recovery as described herein. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

The following examples pertain to further embodiments.

In one example, an apparatus includes at least one core and a physical circuit coupled to the at least one core. The physical circuit may comprise: a physical unit to communicate information from the at least one core to a memory via a link; and a link training controller to train the link. The link training controller is to: update a first link parameter of a link setting for the link to a first value; write data to the memory; read the data from the memory using the first value of the first link parameter; and in response to a determination that the data read from the memory does not match the data written to the memory, send an in-band link recovery command to the memory via the link to cause the memory to participate in a link recovery protocol with the apparatus, the link recovery protocol including an update of the first link parameter to a second value, wherein the in-band link recovery command includes the second value.

In an example, the apparatus further comprises a configuration storage to store an initial value for the first link parameter of the link setting for the link.

In an example, the configuration storage is further to store a trained value for the first link parameter, after the link training.

In an example, the link training controller is to determine the second value comprising a safe value.

In an example, the link training controller is to cause the link to be reset in response to a determination of a failure on the link during the link recovery protocol.

In an example, the physical circuit is to send the in-band link recovery command comprising a plurality of unit intervals, each of the plurality of unit intervals comprising a predetermined command portion and the second value.

In an example, the physical circuit is to send a strobe signal to indicate valid information during a mid-portion of the plurality of unit intervals.

In an example, the apparatus comprises a system on chip and the memory comprises a non-volatile memory coupled to the system on chip via the link.

In another example, a method comprises: during a link training of a link that couples a first device and a second device, updating a first link parameter of a link setting for the link to a first value; communicating information via the link to identify whether a failure occurs on the link using the first link parameter having the first value; and in response to identifying the failure, sending a recovery command to the second device via the link to cause the second device to enter a link recovery in which the first link parameter is updated to a second value without a reset of the link.

In an example, the method further comprises resetting the link in response to identifying another failure that occurs on the link during the link recovery using the first link parameter having the second value.

In an example, the link recovery comprises: sending a predetermined data pattern to the second device; receiving the predetermined data pattern from the second device; and identifying the another failure if the received predetermined data pattern does not at least substantially correspond to the predetermined data pattern sent to the second device.

In an example, the method further comprises: obtaining the predetermined data pattern from a configuration storage, the predetermined data pattern different from a second predetermined data pattern obtained from the configuration storage, and where communicating the information via the link to identify whether the failure occurs on the link comprises: sending the second predetermined data pattern to the second device; and receiving the second predetermined data pattern from the second device.

In an example, the recovery command comprises a predetermined command portion and the second value, the second value comprising a safe value for the first link parameter.

In an example, the method further comprises sending the recovery command comprising a plurality of unit intervals, each of the plurality of unit intervals comprising the predetermined command portion and the second value.

In an example, the method further comprises sending the recovery command on an in-band portion of the link.

In an example, the method further comprises sending a strobe signal to indicate valid information on the in-band portion of the link during a mid-portion of the plurality of unit intervals.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor having at least one core and a physical circuit coupled to the at least one core to communicate with at least one device via an interconnect, and a controller to train the interconnect. The controller is to: update a first parameter of a setting for the interconnect to a first value; receive, using the first parameter having the first value, a data pattern from the at least one device via the interconnect; and determine whether the data pattern corresponds to a first data pattern sent from the processor to the at least one device, and in response to a determination that the data pattern does not correspond, send a recovery command to the at least one device via the interconnect to cause the at least one device to participate in a link recovery protocol with the processor without a reset of the interconnect or a re-initialization of the at least one device. The system further includes the at least one device coupled to the processor via the interconnect.

In an example, the controller is to send the recovery command comprising a plurality of unit intervals, each of the plurality of unit intervals comprising a predetermined command portion and a second value for the first parameter of the setting, the second value at a level at which a prior communication on the interconnect occurred without failure.

In an example, the physical circuit is to send a strobe signal to indicate valid information during a mid-portion of the plurality of unit intervals.

In an example, the controller is to: resume training of the interconnect in response to receipt, after the recovery command is sent, of an acknowledgment message from the at least one device via the interconnect, the acknowledgement message comprising a second plurality of unit intervals, each of the second plurality of unit intervals comprising a predetermined acknowledgement indicator; and cause the interconnect to be reset and the at least one device to be re-initialized if the controller does not receive the acknowledgement message from the at least one device.

In another example, an apparatus comprises: means for updating a first link parameter of a link setting for a link that couples a first device to a memory to a first value; means for writing data to the memory via the link; means for reading the data from the memory via the link using the first value of the first link parameter; means for determining whether the data read from the memory at least substantially matches the data written to the memory; and means for sending a link recovery command to the memory via the link to cause the memory to participate in a link recovery protocol including an update of the first link parameter to a second value, wherein the link recovery command includes the second value.

In an example, the apparatus further comprises means for causing the link to be reset in response to determining a failure on the link during the link recovery protocol.

In an example, the means for sending is to send the link recovery command comprising a plurality of unit intervals, each of the plurality of unit intervals comprising a predetermined command portion and the second value.

In an example, the apparatus further comprises means for sending a strobe signal to indicate valid information during a mid-portion of the plurality of unit intervals.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions, Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
at least one core; and
a physical circuit coupled to the at least one core, the physical circuit comprising:
a physical unit to communicate information from the at least one core to a memory via a link; and
a link training controller to train the link, wherein the link training controller is to:
update a first link parameter of a link setting for the link to a first value;
write data to the memory;
read the data from the memory using the first value of the first link parameter; and
in response to a determination that the data read from the memory does not match the data written to the memory, send an in-band link recovery command to the memory to cause the memory to participate in a link recovery protocol, the link recovery protocol including an update of the first link parameter to a second value, wherein the in-band link recovery command includes the second value.

2. The apparatus of claim 1, further comprising a configuration storage to store an initial value for the first link parameter of the link setting for the link.

3. The apparatus of claim 2, wherein the configuration storage is further to store a trained value for the first link parameter, after the link training.

4. The apparatus of claim 2, wherein the link training controller is to determine the second value comprising a safe value.

5. The apparatus of claim 1, wherein the link training controller is to cause the link to be reset in response to a determination of a failure on the link during the link recovery protocol.

6. The apparatus of claim 1, wherein the physical circuit is to send the in-band link recovery command comprising a plurality of unit intervals, each of the plurality of unit intervals comprising a predetermined command portion and the second value.

7. The apparatus of claim 6, wherein the physical circuit is to send a strobe signal to indicate valid information during a mid-portion of the plurality of unit intervals.

8. The apparatus of claim 1, wherein the apparatus comprises a system on chip and the memory comprises a non-volatile memory coupled to the system on chip via the link.

9. At least one non-transitory machine-readable medium having stored thereon instructions, which if performed by a machine cause the machine to perform a method comprising:
during a link training of a link that couples a first device and a second device, updating a first link parameter of a link setting for the link to a first value;
communicating information via the link to identify whether a failure occurs on the link using the first link parameter having the first value; and
in response to identifying the failure, sending a recovery command to the second device to cause the second device to enter a link recovery in which the first link parameter is updated to a second value without a reset of the link, wherein the recovery command comprises a predetermined command portion and the second value comprises a safe value for the first link parameter.

10. The at least one non-transitory machine-readable medium of claim 9, wherein the method further comprises resetting the link in response to identifying another failure that occurs on the link during the link recovery using the first link parameter having the second value.

11. The at least one non-transitory machine-readable medium of claim 10, wherein the link recovery comprises:
sending a predetermined data pattern to the second device;
receiving the predetermined data pattern from the second device; and
identifying the another failure if the received predetermined data pattern does not at least substantially correspond to the predetermined data pattern sent to the second device.

12. The at least one non-transitory machine-readable medium of claim 11, wherein the method further comprises:
obtaining the predetermined data pattern from a configuration storage, the predetermined data pattern different from a second predetermined data pattern obtained from the configuration storage, wherein communicating the information via the link to identify whether the failure occurs on the link comprises:

sending the second predetermined data pattern to the second device; and receiving the second predetermined data pattern from the second device.

13. The at least one non-transitory machine-readable medium of claim 9, wherein the method further comprises sending the recovery command comprising a plurality of unit intervals, each of the plurality of unit intervals comprising the predetermined command portion and the second value.

14. The at least one non-transitory machine-readable medium of claim 13, wherein the method further comprises sending a strobe signal to indicate valid information on the in-band portion of the link during a mid-portion of the plurality of unit intervals.

15. The at least one non-transitory machine-readable medium of claim 9, wherein the method further comprises sending the recovery command on an in-band portion of the link.

16. A system comprising:

a processor having at least one core and a physical circuit coupled to the at least one core, the physical circuit to communicate with at least one device via an interconnect, and a controller to train the interconnect, wherein the controller is to:

update a first parameter of a setting for the interconnect to a first value;

receive, using the first parameter having the first value, a data pattern from the at least one device via the interconnect; and determine whether the data pattern corresponds to a first data pattern sent from the processor to the at least one device, and in response to a determination that the data pattern does not correspond, send a recovery command to the at least one device to cause the at least one device to participate in a link recovery protocol with the processor without a reset of the interconnect or a re-initialization of the at least one device; and the at least one device coupled to the processor via the interconnect.

17. The system of claim 16, wherein the controller is to send the recovery command comprising a plurality of unit intervals, each of the plurality of unit intervals comprising a predetermined command portion and a second value for the first parameter of the setting, the second value at a level at which a prior communication on the interconnect occurred without failure.

18. The system of claim 17, wherein the physical circuit is to send a strobe signal to indicate valid information during a mid-portion of the plurality of unit intervals.

19. The system of claim 18, wherein the controller is to:

resume training of the interconnect in response to receipt, after the recovery command is sent, of an acknowledgment message from the at least one device via the interconnect, the acknowledgement message comprising a second plurality of unit intervals, each of the second plurality of unit intervals comprising a predetermined acknowledgement indicator; and cause the interconnect to be reset and the at least one device to be re-initialized if the controller does not receive the acknowledgement message from the at least one device.

* * * * *